United States Patent [19]

Alon

[11] Patent Number: 5,959,953
[45] Date of Patent: Sep. 28, 1999

[54] METHODS AND APPARATUS FOR PERFORMING CROSS-TALK CORRECTION IN A MULTI-TRACK OPTICAL DISK READER BASED ON MAGNIFICATION ERROR

[75] Inventor: Amir Alon, Sunnyvale, Calif.

[73] Assignee: Zen Research NV, Curacao, Netherlands Antilles

[21] Appl. No.: 09/042,185

[22] Filed: Mar. 12, 1998

Related U.S. Application Data

[63] Continuation-in-part of application No. 08/675,526, Jul. 3, 1996, Pat. No. 5,729,512.

[51] Int. Cl.[6] .................................................. G11B 7/00
[52] U.S. Cl. ................................. 369/44.41; 369/44.37; 369/124
[58] Field of Search ............................. 369/124, 44.37, 369/44.41, 44.32, 44.35, 44.36

[56] References Cited

U.S. PATENT DOCUMENTS

| | | | |
|---|---|---|---|
| 4,272,651 | 6/1981 | Yoshida et al. | 369/112 |
| 4,459,690 | 7/1984 | Corsover et al. | 369/44 |
| 4,536,866 | 8/1985 | Jerome et al. | 369/112 |
| 4,875,076 | 10/1989 | Torigoe et al. | 355/53 |
| 5,144,616 | 9/1992 | Yasukawa et al. | 369/122 |
| 5,181,161 | 1/1993 | Hriose et al. | 369/124 |
| 5,283,778 | 2/1994 | Maeda | 369/112 |
| 5,309,205 | 5/1994 | Hayano | 355/243 |
| 5,400,312 | 3/1995 | Haraguchi | 369/124 |
| 5,483,511 | 1/1996 | Jewell et al. | 369/44.37 |
| 5,483,515 | 1/1996 | Cheng et al. | 369/124 |
| 5,493,553 | 2/1996 | Maurice et al. | 369/109 |
| 5,544,141 | 8/1996 | Kawasaki | 369/44.32 |
| 5,573,492 | 11/1996 | Dianna et al. | 600/117 |
| 5,602,383 | 2/1997 | Takekoshi et al. | 250/201.5 |
| 5,642,341 | 6/1997 | Stork | 369/44.41 |
| 5,729,514 | 3/1998 | Horigome et al. | 369/44.37 |

FOREIGN PATENT DOCUMENTS

| | | |
|---|---|---|
| 0 441 435 A1 | 8/1991 | European Pat. Off. . |
| 0 545 526 A1 | 6/1993 | European Pat. Off. . |
| 25 43 276 | 3/1977 | Germany . |
| 62-60731 | 12/1987 | Japan . |
| 4-10141 | 2/1992 | Japan . |
| 7-92924 | 10/1995 | Japan . |
| WO 94/19796 | 9/1994 | WIPO . |

OTHER PUBLICATIONS

Smith, W.J., "Anamorphic Systems," *Modern Optical Engineering*, Jan. 1, 1966, pp. 239–241.
Smith, W.J., "Variable Power (Zoom) Systems," *Modern Optical Engineering*, Jan. 1, 1966, pp. 241–245.

*Primary Examiner*—Thang V. Tran
*Attorney, Agent, or Firm*—Fish & Neave; Nicola A. Pisano

[57] ABSTRACT

An optical pickup assembly for a multitrack optical disk reader includes a multi-element photodetector onto which a plurality of reflected track images are projected. Circuitry is provided for detecting a magnification error, and for generating a magnification error correction signal to correct or compensate for the magnification error. Circuitry is also provided for correcting for cross-talk components in the output signals of the multi-element photodetector responsive to the detected magnification error.

20 Claims, 7 Drawing Sheets

METHODS AND APPARATUS FOR PERFORMING CROSS-TALK CORRECTION IN A MULTI-TRACK OPTICAL DISK READER BASED ON MAGNIFICATION ERROR

REFERENCE TO RELATED APPLICATION

The present application is a continuation-in-part of U.S. patent application Ser. No. 08/675,526, filed Jul. 3, 1996, now U.S. Pat. No. 5,729,512, issued Mar. 17, 1998.

FIELD OF THE INVENTION

This invention relates to methods and apparatus for simultaneously reading multiple adjacent data tracks from an optical disk, and more particularly to methods and apparatus for detecting and compensating for cross-talk resulting from magnification errors.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD) format was developed and marketed for the distribution of musical recordings and has replaced vinyl records. High-capacity, read-only data storage media, such as CD-ROM and Digital Versatile Disk (DVD), have become prevalent in the personal computer field, and the DVD format may soon replace videotape as the distribution medium of choice for video information.

Recently, relatively inexpensive optical disk writers and writable optical media have become available, making optical disks popular as backup and archival storage devices for personal computers. The large storage capacity of writable optical disks also makes them ideal for use in multimedia authoring and in other applications which require access to large amounts of storage. Current writable optical disk technologies include several write-once technologies, such as CD-Recordable (CD-R). A few technologies permit writing, erasing, and rewriting data on a disk, such as Mini-Disk (MD), which uses magneto-optical technology. Other writable formats employ phase-change and dye-polymer technology. Recent advances in writable optical disk technology have made rewritable optical media more practical, and the specification for DVD-RAM calls for use of high-capacity rewritable optical media. These writable and rewritable formats are expected to further increase the use of optical disks as a data storage solution for use with personal computers.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical and imaging systems detect the modulated, reflected, laser light and produce an electrical signal which may be decoded to recover the digital data stored on the optical disk.

To be able to retrieve data from an optical disk, the optical systems include an optical pickup assembly which may be positioned to read data on any disk track. Processor-driven servo mechanisms are provided for focusing the optical system and for keeping the optical pickup assembly positioned over the track, despite disk warpage or eccentricity.

Because in most previously known systems the data is read serially, i.e. one bit at a time, the maximum data transfer rate for an optical disk reader is typically determined by the rate at which the pits on the disk pass by the optical pickup assembly. The linear density of the bits and the track pitch (distance between tracks) are fixed by the specification of the particular optical disk format. For example, CD disks employ a track pitch of 1.5 $\mu$m (±0.1 $\mu$m), while DVD employs a track pitch only about one-half as wide.

Previously known methods of increasing the data transfer rate of optical disk readers have focused on increasing the rate at which the pits pass by the optical pickup assembly by increasing the rotational speed of the disk itself. Currently, drives with rotational speeds of up to 16x standard speed are commercially available, and even faster reading speeds have been achieved by moving to constant angular velocity designs. Higher disk rotational speeds, however, place increased demands on the optical and mechanical subsystems within the optical disk drive, create greater vibration, and may make such drives more difficult and expensive to design and manufacture.

A cost effective alternative to increasing the disk rotational speed to provide faster optical disk readers is to read multiple data tracks simultaneously. Numerous methods for generating multiple beams to read several tracks simultaneously have been used. U.S. Pat. No. 5,144,616 to Yasukawa et al., for example, shows an array of laser diodes which may generate multiple beams for use in simultaneously reading multiple tracks of an optical disk. U.S. Pat. No. 4,459,690, to Corsover, uses acousto-optical techniques to split a beam into multiple beams for use in reading an optical disk. Other systems have used a diffraction grating to generate multiple beams used to simultaneously illuminate multiple tracks. The system described in commonly assigned U.S. Pat. No. 5,426,623, to Alon et al., uses a wide area illumination beam to simultaneously read multiple tracks of an optical disk.

Using a system which reads multiple tracks simultaneously may provide for dramatic increases in the speed of optical disk readers. For example, a drive which rotates the disk at only eight times the standard speed (i.e. an 8X drive), and reads seven tracks simultaneously, may provide reading speeds equivalent to a true 56X drive.

It should be noted that as used herein, a data track is a portion of the spiral data track of a typical optical disk, and follows the spiral for one rotation of the disk. Thus, a drive capable of reading multiple data tracks simultaneously will read multiple portions of the spiral data track at once. For optical disks having concentric circular tracks, a data track would refer to one such circular track. For disks having multiple concentric spiral tracks, such as those described in commonly assigned, copending U.S. patent application Ser. No. 08/885,425, filed Jun. 30, 1997, a data track would refer to one of the concentric spiral tracks.

Implementation of simultaneous multiple track reading capability for optical disks presents new design challenges. If multiple beams are used, for example, the beams must be properly aligned with the tracks being read, and the beams reflected from the optical disk must be correctly aligned with the photodetector. Manufacturing tolerances may lead to minor differences in magnification of an optical pickup assembly, leading to minor differences in the spacing of the beams between systems. These errors may result in a portion of the light beam reflected from one track being read by a photodetector associated with a neighboring track.

Additionally, there is some variation in the track pitch allowed in the specification of most optical disk formats, such as the CD and the DVD formats. A multi-beam optical disk reader using such a format must be able to detect and correct for these magnification errors and track pitch variations to insure that the beams are correctly aligned with the tracks. Such errors arising from track pitch variations also may result in a portion of the light beam reflected from one track being read by a photodetector associated with a neighboring track.

It would therefore be desirable to provide apparatus and methods that enable detection and correction of magnification errors arising due to optical system manufacturing variations, and that enable cross-talk components arising due to such magnification errors to be corrected.

It further would therefore be desirable to provide apparatus and methods that enable detection and correction of magnification errors arising due to track pitch variations, and that enable cross-talk components arising due to such magnification errors to be corrected.

SUMMARY OF THE INVENTION

In view of the foregoing, it is an object of this invention to provide apparatus and methods that enable detection and correction of magnification errors arising due to optical system manufacturing variations, and that enable cross-talk components arising due to such magnification errors to be corrected.

It is a further object of the invention to provide apparatus and methods that enable detection and correction of magnification errors arising due to track pitch variations, and that enable cross-talk components arising due to such magnification errors to be corrected, so that recorded data may be read accurately and reliably.

These and other objects of the present invention are accomplished by providing an optical pickup assembly having a multi-element photodetector onto which a plurality of reflected track images are projected. Circuitry is provided for detecting a magnification error, and for generating a magnification error correction signal to correct or compensate for the magnification error. Circuitry is also provided for correcting for cross-talk components in the output signals of the multi-element photodetector responsive to the detected magnification error.

BRIEF DESCRIPTION OF THE DRAWINGS

The above and other objects of the invention, its nature and various advantages, will be apparent upon consideration of the following detailed description, taken in conjunction with the accompanying drawings, in which like reference characters refer to like parts throughout, and in which:

FIG. 3A illustrates the ideal alignment between projected track images and photodetector elements, whereas

FIG. 6A represent scanning multiple data tracks without magnification errors, whereas

DETAILED DESCRIPTION OF THE INVENTION

Figure 1:
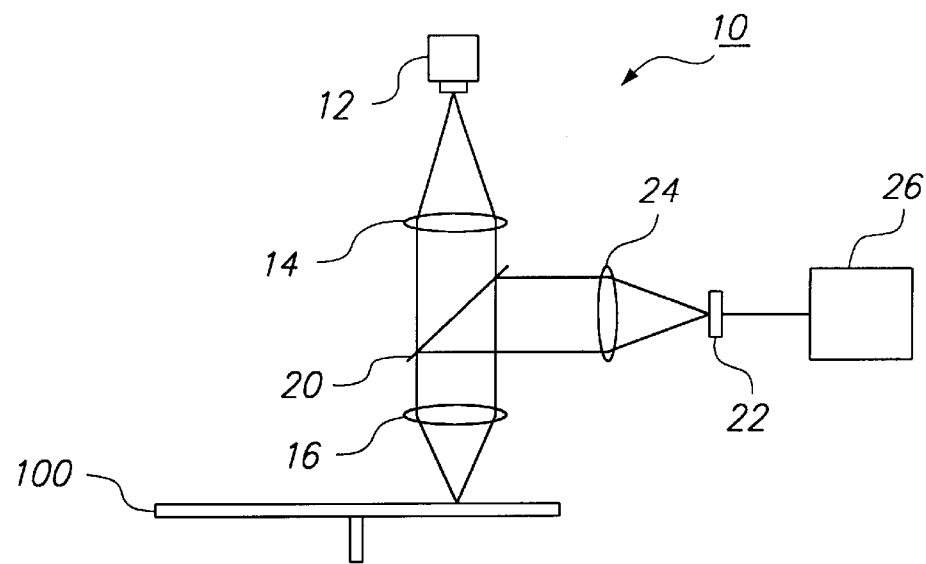
FIG. 1 is a schematic representation of an optical pickup as used to read an optical disk.

Referring first to FIG. 1, a simplified diagram of optical pickup assembly 10 for an optical disk reader constructed in accordance with the principles of the present invention is described. Individual components of optical pickup assembly 10 may comprise elements used in previously known CD-ROM and DVD drives. Light from light source 12, typically a laser diode, is focused and collimated by lenses 14 and 16 to illuminate a portion of optical disk 100. Optical disk 100 contains a data layer (not shown) in which the data is recorded, typically in the form of pits (or bumps) in the data layer. Alternatively, some recordable optical disks use physical or chemical properties of the data layer material, such as its magnetic properties, or its ability to polarize incident light, to record the data.

The light from light source 12 is reflected by the data layer and modulated by the data recorded therein. The reflected light is directed toward photodetector 22 by beam splitter 20, which may be a half-silvered mirror. Lens 24 may be provided to further focus the reflected light from the surface of optical disk 100 to form an image on photodetector 22, which converts the image into electrical signals. Processing circuitry 26 decodes and processes the electrical signal generated by photodetector 22 to recover the data recorded on the optical disk. Additional circuitry, as described, for example, in commonly assigned U.S. Pat. No. 5,627,805, converts the data to a format for use by a computer or other processing device and acts as an interface between the optical disk reader and the computing device.

The description of the optical disk reader of FIG. 1 is provided to aid in the understanding of the principles of the present invention. It is understood that many variations and embellishments of the basic optical pickup assembly are possible. For example, beam splitter 20 may be a diffraction grating or half-silvered mirror, and fiber optic wave guides may be used in place of one or more of mirror 20 and lenses 14, 16, and 24. Several possible configurations of optical pickup assemblies are discussed in *Compact Disk Technology*, Nakajima, H. and Ogawa, H., translated by Aschmann, C., published by Ohmsha, Ltd., Japan (1992), and *The Compact Disc Handbook*, Pohlmann, K., 2d. ed., A-R Editions, 1992. The principles of the present invention are not limited to an optical pickup assembly as disclosed in FIG. 1, but are easily adaptable to a wide variety of optical pickup assembly designs.

Figure 2:
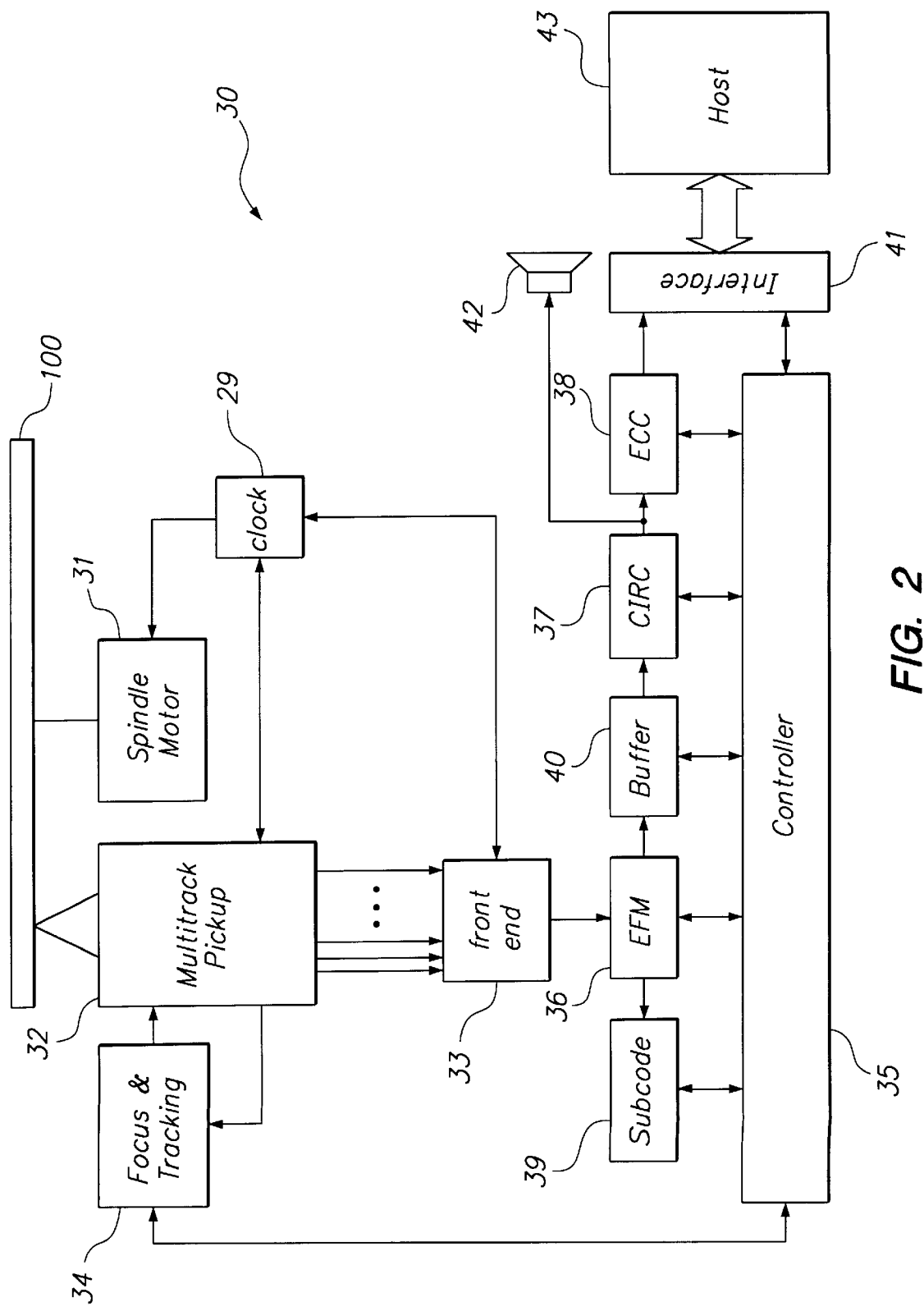
FIG. 2 is a block diagram of an optical pickup assembly for a multi-track optical disk reader constructed in accordance with the principles of the present invention.

Referring now to FIG. 2, optical disk reader 30 is described that provides a high data transfer rate by simultaneously reading multiple tracks of data from an optical disk using multiple beams. Optical disk reader 30 comprises spindle motor 31 that rotates optical disk 100 at high speed with either constant linear velocity or constant angular velocity. Multitrack pickup 32 includes a laser diode, a diffractive grating that splits the laser beam into seven or more reading beams, and a multi-element photodetector. Alternatively, multi-track pickup 32 may include an array of laser diodes, as described in the above-mentioned U.S. Pat. No. 5,144,616, wherein each laser diode generates one or more of the reading beams.

The multi-element photodetector of multitrack pickup 32 receives light reflected from multiple tracks and generates electrical signals representative of information-bearing features of a reflective surface of optical disk 100. The electrical signals from the multi-element photodetector are passed to front end circuitry 33 to extract a digital data signal for each of the multiple tracks.

Front end 33 also preferably includes circuitry to generate a clock that synchronizes the data recovery from the multiple tracks, to account for differences in linear velocities between the inner and outermost track being read. Such synchronization circuitry is described, for example, in U.S. Pat. No. 5,627,805. Multi-track pickup 32 also provides tracking error and focus error signals to focus and tracking circuitry 34.

Under the control of controller 35, the data signals are further processed by eight-to-fourteen (EFM) (or similar) demodulation circuitry 36, Cross Interleaved Reed-Solomon Code (CIRC) (or similar) circuitry 37, error correction code (ECC) circuitry 38, and subcode circuitry 39. Controller 35 also controls focus and tracking circuitry 34, as well as buffer memory 40 and interface 41.

For a digital audio system, the data signals may be processed into suitable analog signals (using circuitry not shown) connected to audio means 42. Similarly, if the optical disk contains video images, the data signals may be processed for direct display on a TV or monitor. In computer applications the data signals are typically transferred from buffer memory 40 to host processor 43 via interface 41.

Buffer memory 40 buffers data read from the multiple data tracks and decouples the process of reading data from optical disk 100 from the process of transferring the data to host processor 43. Buffer memory 40 therefore is large enough to hold about as many data blocks from multiple data tracks of optical disk 100 as can be read in one revolution of optical disk 100. Controller 35 maps data from the multiple data tracks to buffer memory 40 so that individual data blocks will be correctly assembled without overwriting one another, as described in U.S. Pat. No. 5,627,805. Mapping of buffer memory 40 may be either dynamic or static.

Figure 3A:
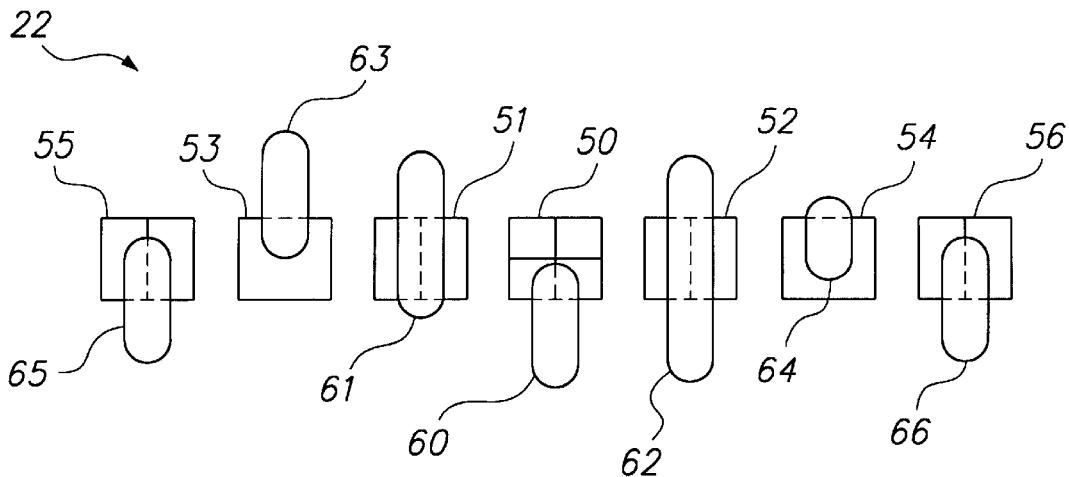

FIG. 3A shows an illustrative embodiment of photodetector 22 of FIG. 1, constructed in accordance with the principles of the present invention, for imaging multiple data tracks of optical disk 100. Photodetector 22 includes an array of elements, 50 through 56, such that there is one element for each track to be read from the optical disk. In FIG. 3A, track images 60–66, representing portions of adjacent data tracks on optical disk 100, are shown projected onto photodetector elements 50–56, which each provide an output signal related to the intensity of the light striking it. As discussed hereinabove, the intensity of the light striking the photodetector elements is modulated by the data recorded in the reflective layer of optical disk 100. Therefore, the signals output by elements 50–56 are also modulated by the recorded data.

Preferably, optical pickup assembly 10 is designed so that images of the data tracks (i.e. the pits) on the optical disk are focused onto corresponding ones of elements 50–56. For example, in FIG. 3A, track images 60–66, which correspond to adjacent data tracks on optical disk 100, are properly focused and centered on elements 50–56. In accordance with the principles of the present invention, optical pickup assembly 10 may use multiple individual beams and pickup assemblies of conventional design.

Alternatively, the optical pickup assembly of multitrack pickup 32 may use wide-area illumination as disclosed in commonly assigned U.S. Pat. No. 5,426,623. In yet another alternative, the optical pickup assembly of multitrack pickup 32 may comprise a beam from single laser that is split into multiple beams using a diffraction grating or holographic element as described in copending, commonly assigned, U.S. patent applications Ser. Nos. 08/911,815 and 08/912,881.

Various difficulties may arise in an optical disk reader designed to read multiple tracks simultaneously. For example, an optical pickup assembly may not properly track data tracks on the optical disk, causing track images 60–66 to be misaligned with photodetector elements 50–56.

Figure 3B:
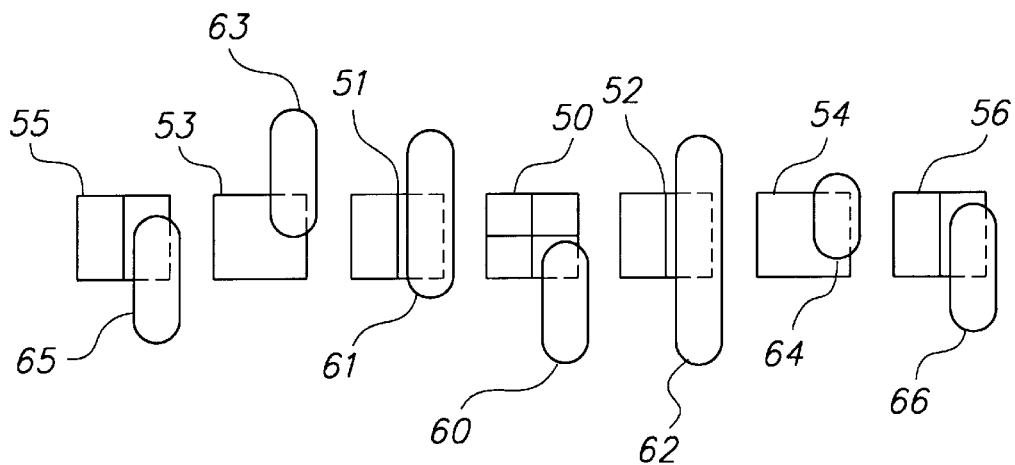
FIGS. 3B and 3C illustrate misalignment between projected track images and photodetector elements resulting from, respectively, tracking errors and magnification errors.

FIG. 3B illustrates misalignment caused by tracking errors, which are characterized by a shift of the entire disk image so that all of track images 60–66 are misaligned by approximately the same amount and in the same direction relative to elements 50–56. In some cases, the misalignment may be severe enough that some portion of a track image may fall outside its corresponding photodetector element. Misalignments caused by such tracking errors may result in a degradation of the ability of the optical pickup assembly to accurately and reliably read the data recorded on the optical disk.

Referring again to FIG. 1, optical pickup assembly 10, including lenses 16 and 24 as well as mirror 20, projects images of pits in the surface of disk 100 onto photodetector 22. The magnification of an optical system is the ratio of the angle subtended by the image to the angle subtended by the object and is a function of the focal lengths of the components in the optical system. Preferably, the magnification of the disk image due to the optical path between optical disk 100 and photodetector 22 is such that the spacing between the projected track images 60–66 of adjacent tracks matches the spacing between adjacent photodetector elements 50–56. For example, in FIG. 3A, the track image spacing is approximately the same as the spacing between the photodetector elements, so that track images 60–66 are centered on corresponding elements 50–56.

However, optical pickup assembly 10 is typically a manufactured assembly consisting of multiple individual parts. Manufacturing tolerances, temperature changes, and component aging may alter the relative positions of the component parts of optical pickup assembly 10, thereby causing the magnification of optical pickup assembly 10 to vary from one assembly to the next, or even during the lifetime of a single assembly. Therefore, it is probable that for any specific unit, the magnification of the optical path from disk 100 to photodetector 22 will not be ideal, and projected track images 60–66 will not be aligned with their corresponding photodetector elements.

Figure 3C:
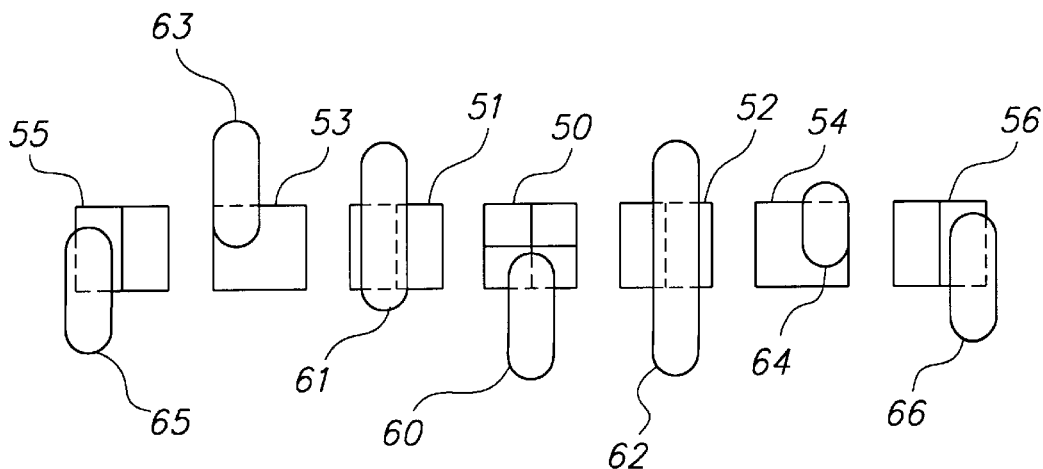

For example, optical pickup assembly 10 may excessively magnify the image of optical disk 100, causing track images 60–66 to be misaligned with their corresponding photodetector elements. This is illustrated in FIG. 3C, wherein optical pickup assembly 10 overmagnifies the image of the disk surface, i.e. the magnification is too high. As illustrated, optical pickup assembly 10 tracks data tracks so that track image 60 is aligned with element 50. However, track images 61–66, corresponding to data tracks adjacent to the track imaged in track image 60, are not properly aligned with their corresponding photodetector elements. Rather, the spacing between the images is increased, thereby displacing track images 61–66 away from track image 60.

Similar effects may be caused by variations in track pitch. For example, the CD-ROM specification provides for a track pitch of 1.5±0.1 microns. Thus, an optical pickup assembly that correctly projects track images when reading an optical disk having a track pitch of 1.4 microns will appear to have an overmagnification error when reading an optical disk having a track pitch of 1.6 microns. Even small variations in track pitch may cause significant errors when reading a number of tracks in parallel. For example, a track pitch variation of 0.1 micron can result in a total variation of up to 1.0 micron across ten adjacent data tracks being read in parallel. As used herein, the term magnification error refers to errors caused by either optical magnification and/or track pitch variation.

Misalignment between track images and photodetector elements due to tracking and/or magnification errors may increase the rate of errors in reading data from optical disk 100. Although optical disks are encoded with redundant information, providing a certain degree of error detection and correction, excessive read errors may require portions of a data track to be read again. Rereading data necessarily slows the overall data transfer rate and, therefore, negatively impacts the ability to achieve high data transfer rates through simultaneously reading multiple data tracks.

Figure 4:
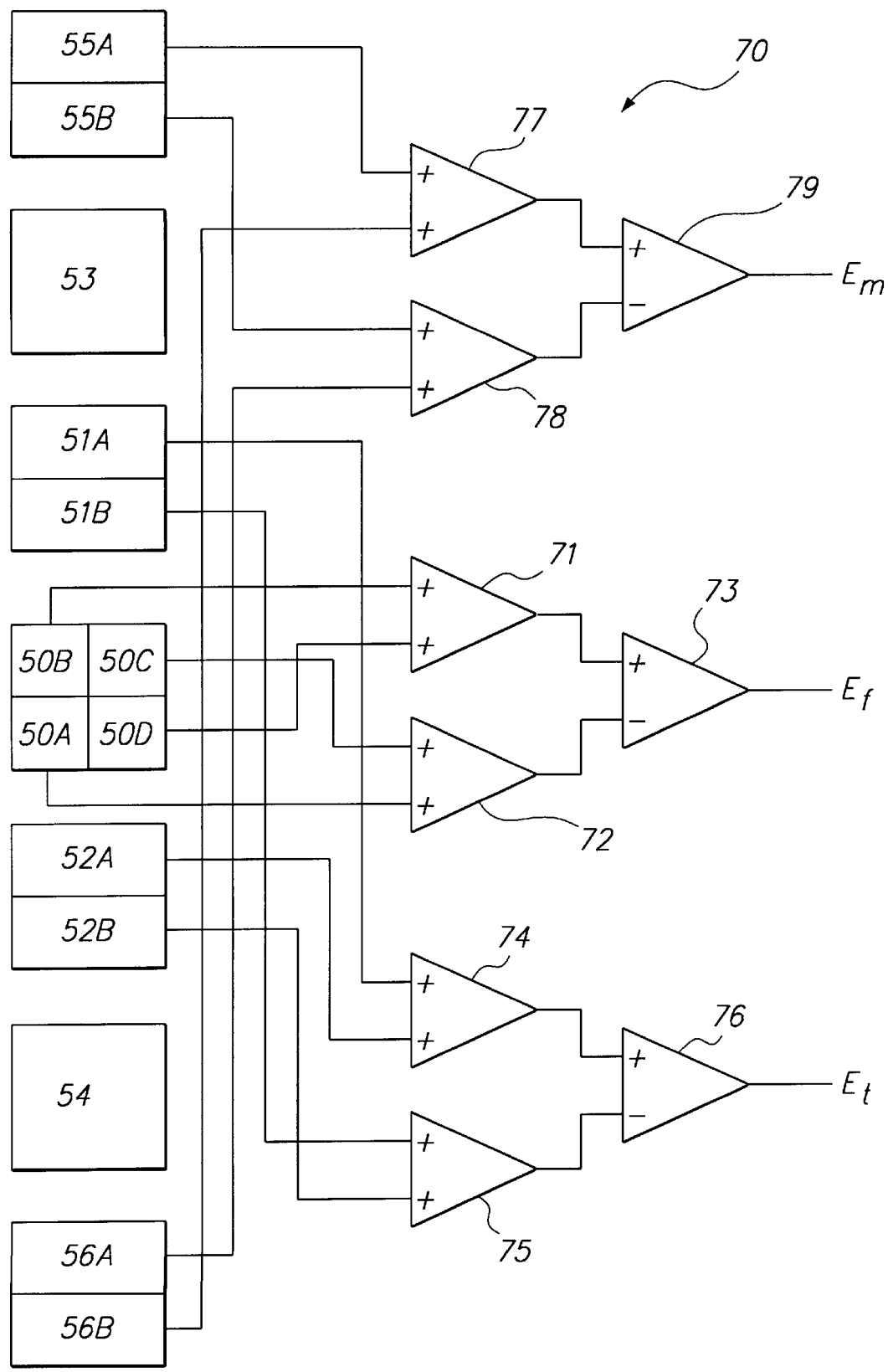
FIG. 4 is a schematic of illustrative circuitry for determining focus, tracking, and magnification errors.

Referring now to FIG. 4, photodetector elements 50–56 of FIG. 3A are described in greater detail. FIG. 4 also illustrates circuitry for extracting tracking, focus, and magnification error signals from the signals output by elements 50–56. Central element 50 is a split photodiode having four divisions, 50A–D, and elements 51–52, and 55–56 are split photodiodes having two divisions. Each photodiode, or each division of a split photodiode, is electronically biased so that it outputs a signal proportional to the intensity of the image incident on the photodetector element or division thereof. The multi-element, multi-division design of photodetector 22 provides a set of signals which may be combined to determine the presence of focus, tracking, and magnification errors while reading optical disk 100.

Circuitry 70, comprising a plurality of summing circuits, uses signals from photodiodes 50A–D, 51A–B, 52A–B, 55A–B, and 56A–B to calculate error signals indicative of focus, tracking, and magnification errors as described hereinbelow. Although not shown in FIG. 4, each of the error signals is preferably low-pass filtered to remove unwanted high frequency components and provide a more stable error signal. The error signals may then be used by focus, tracking, and magnification compensation systems of the optical disk reader to compensate for these errors.

The well known astigmatism method of focus error detection, as described in Chapter 6, pages 140–141, of the aforementioned Nakajima text, introduces an astigmatic element in the optical path between optical disk 100 and photodetector 22. When the optical system is in focus, the projected track image is centered on element 50, and symmetrical about its center, so that each division of element 50 receives substantially equal illumination.

If, however, a focus error exists, the astigmatic element distorts the track image, such that is it stretched along one diagonal of photodetector 50 and contracted along the other. As a result, one diagonal pair of the divisions of photodiode 50 receives more illumination that the other pair. Thus, focus error signal, $E_f$, may be calculated from the difference between the sums of the diagonally opposite divisions of photodiode 50 as given by equation (1):

$$E_f = (50A + 50C) - (50B + 50D) \tag{1}$$

Summing amplifiers 71, 72, and 73 of circuitry 70 perform the necessary calculations to produce focus error signal $E_f$. According to equation (1), $E_f$ is zero when the disk image is in focus, and has a non-zero value in the presence of a focus error. A focus servo system may then reposition lenses 16 and 24 of FIG. 1 based on the value of $E_f$, thereby refocusing the images onto photodetector 22.

One skilled in the art will recognize that other focus detection methods may be used within an optical disk reader according to the principles of the present invention. For example, the Foucault method, also described in the Nakajima text at pages 141–142, may be used. In the Foucault method, a prism is placed at the focal point of the optical path of pickup assembly 10. In addition, center element 50 comprises four divisions. A properly focused image, when passed through the prism illuminates each photodetector division equally. However, when the optical pickup assembly is out of focus the illumination falling on the photodetector divisions is unequal, and the difference in illumination strength may be used as a focus error signal.

In addition to generating a focus error signal, circuitry 70 of FIG. 4 also combines the outputs of multi-division photodiodes 51 and 52 to generate tracking error signal, $E_t$. Specifically, summing amplifiers 74, 75 and 76 derive tracking error $E_t$ from the output signals of multi-division photodiodes 51 and 52 according to equation (2):

$$E_t = (51A + 52A) - (51B + 52B) \tag{2}$$

Ideally, the track images projected onto elements 51 and 52 are approximately centered on the photodetector elements so that element divisions 51A and 51B receive equal illumination levels, as do divisions 52A and 52B, as is shown in FIG. 3A. When the photodetector divisions are equally illuminated, the parenthesized terms of equation (2) are nearly equal and $E_t$ is approximately zero.

However, as shown in FIG. 3B, in the presence of a tracking error, photodetector element divisions 51A and 51B receive unequal levels of illumination, as do divisions 52A and 52B. In FIG. 4B, a tracking error is evidenced by the rightward displacement of all track images with respect to their corresponding photodetector elements. In particular, track images 61 and 62 fall almost entirely onto the right hand divisions of elements 51 and 52, respectively (i.e. onto divisions 51B and 52B) and none of the images fall onto the left hand divisions. Because the presence of a data pit causes a reduction in the reflected light, divisions 51A and 52A have a smaller output signal relative to the output signals of element divisions 51B and 52B. From equation (2), $E_t$ will, therefore, have a positive value.

Conversely, if track images 61 and 62 had been displaced to the left, so that they fall on photodetector divisions 51A and 52A, then $E_t$ would have a negative value. Thus, tracking error signal, $E_t$, indicates both direction and magnitude of any tracking error present, and may be used as an input to a tracking servo system to maintain proper tracking of optical pickup assembly 10 in multi-track optical disk reader 30 of FIG. 2.

Still referring to FIG. 4, circuitry 70 also combines output signals from the divisions of photodetector elements 55 and 56 to determine the presence of magnification errors.

Specifically, the magnification error, $E_m$, calculated by summing amplifiers 77, 78 and 79 according to equation (3):

$$E_m = (55A + 56B) - (55B + 56A) \quad (3)$$

FIG. 3C shows track images 60–66 projected onto elements 50–56 in the presence of an overmagnification error. The magnification error causes the separation between adjacent track images to be increased relative to the interphotodetector spacing. As shown, track images 65 and 66 fall almost entirely onto element divisions 55A and 56B, respectively. This causes divisions 55A and 56B to have an output signal relatively greater than the output signals of divisions 55B and 56A. Thus, the first term of equation (3) is greater than the second and the magnification error signal, $E_m$, is positive.

Conversely, under conditions of undermagnification, track images 55 and 56 fall onto divisions 55B and 56A, respectively, and the magnification error signal is negative. $E_m$ is used by front end circuitry 33 to correct or compensate for the presence of magnification errors, as described below.

Figure 5A:
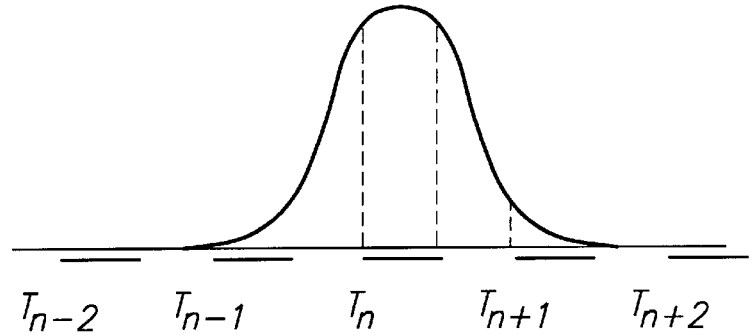
FIGS. 5A and 5B show an optical transfer function of a photodetector element used to read a data tracks from an optical disk with and without magnification errors, respectively.

Each photodetector element has a characteristic optical transfer function that represents how visible an optical disk appears to the element. A typical optical transfer function for a single element, $P_j$, is a bell-shaped curve, such as that shown in FIG. 5A. The curve of FIG. 5A shows that the optical response is strongest near the axis of element $P_j$ and gradually diminishes toward zero off-axis. Thus, that portion of the optical disk projected onto the center of a photodetector element is more visible than that portion projected to one side or the other.

Furthermore, the intensity, or strength, of an illumination spot is not uniformly distributed. Indeed, the intensity has a distribution known as an Airy pattern, wherein the intensity of an illumination spot is strongest in a central portion of the beam and generally weakens farther from the center. The CD specifications for track pitch were chosen in part so that an adjacent track lies at a minimum in the intensity distribution of an illumination spot. As a result, a track is more strongly illuminated when it is near the center of an illumination spot, than when it is nearer an edge of the spot.

For typical single track optical disk readers, under proper focus and tracking conditions, the illumination spot is centered on the track being read, and the track image is centered on the photodetector. Under such conditions, the tracks adjacent to the track being read receive little illumination and are also near the edge of the visible area of the photodetector element. Thus, the effect of the element 'seeing' a neighboring track is likely to be small enough to be ignored.

Figure 5B:
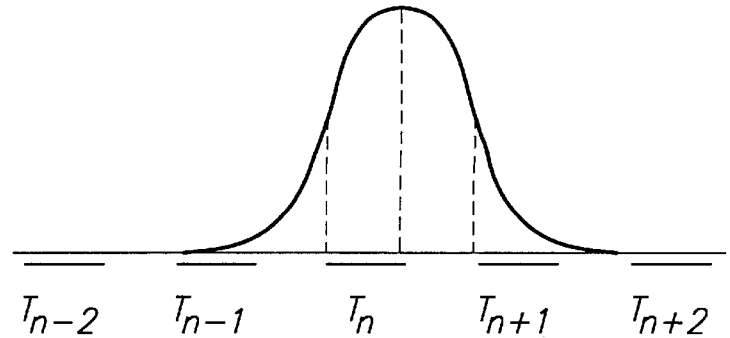

When trying to read multiple tracks, however, the presence of magnification errors may cause a photodetector element to receive a portion of the light beam reflected from an adjacent track. As shown in FIG. 5B, when a photodetector is not aligned with a corresponding projected track image, the strength of the illumination received from an adjacent track increases rapidly, and may contribute significant cross talk.

Figure 6A:
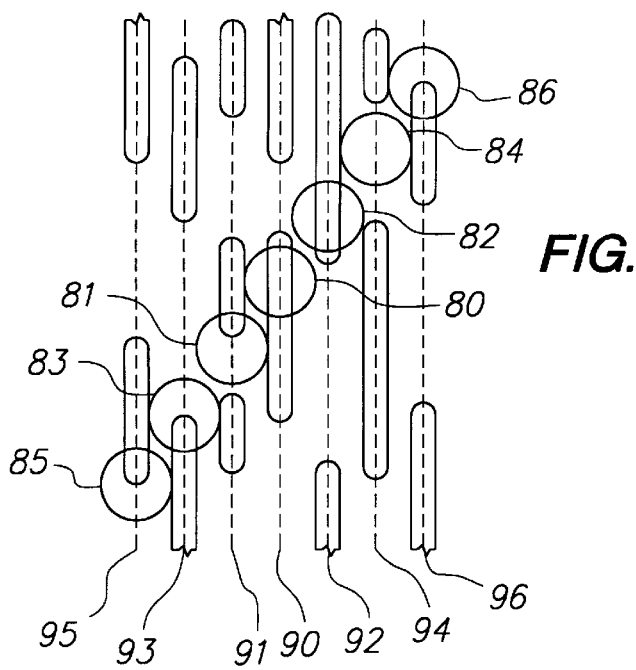
Figure 6B:
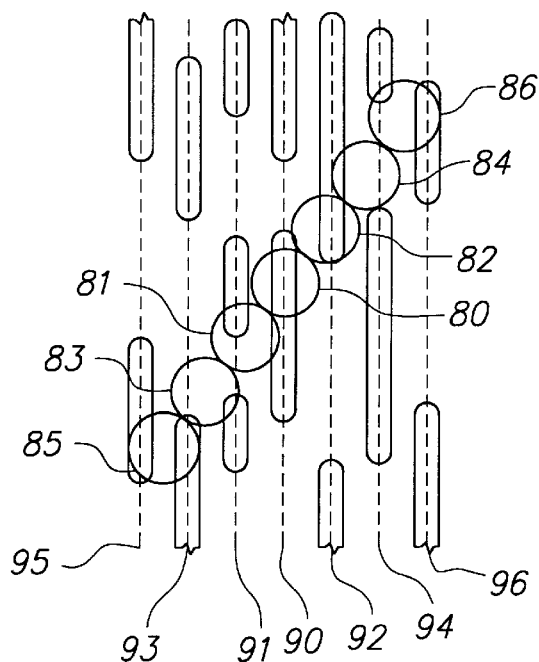
FIGS. 6B and 6C represent scanning the data tracks with magnification errors.
Figure 6C:
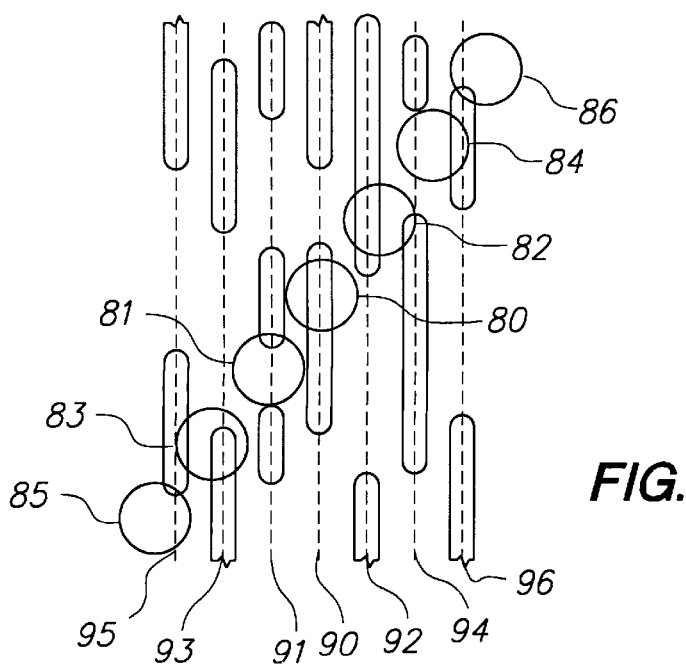

As shown in FIGS. 6A–C, the effect of magnification errors on cross talk are largest on photodetector elements furthest from the central element. Moreover, the cross talk effects are larger at tracks having a small radius (e.g, near the center of optical disk 100) than tracks having large radius. Although, tracks 90–96 are shown as straight lines in FIGS. 6A–C, they are in fact portions of a spiral, and the curvature of the tracks being read varies with their location on the disk, i.e., with their radius. Thus, tracks near a center of the disk are more highly curved than tracks near an outer edge of the disk.

Due to design considerations of the optical pickup assembly for a multi-track reader, the fields of view are staggered so as to form an angle relative to the data tracks, as opposed to being arranged in a radial direction. As a result of this staggered arrangement of the fields of view, combined with the varying curvature of the data tracks, overlap between a field of view and an adjacent track also varies with the location of a track on the disk.

The tracking error signal derived above preferably is used to track the data track for the central beam and central element, i.e., for element 50 of FIGS. 3A–C. Under proper focus and tracking conditions, the central beam will be centered on the track being read, and track image 60 will likewise be centered on central element 50. It is expected that under such conditions, the tracks adjacent to the central track will receive little illumination from the central reading beam, and also that the adjacent tracks will be near the edge of the area imaged onto element 50. Thus, the effect of central element 50 "seeing" a neighboring track is likely to be small enough to be ignored.

In the presence of magnification errors, for example, due to variations in the pitch, it is expected that the further a photodetector element is spaced from the central element, the greater the degree of cross-talk that will be present in the data signal generated by that element. In FIGS. 6A–C, circles 80–86 represent the effective field of view of each of the seven elements 50–56, taking into account the optical transfer functions of the photodetector elements and optics, as well as the uneven illumination across an illumination spot. As shown in FIG. 6A, in the absence of magnification errors fields of view 80–86 are centered on corresponding tracks 90–96, and the fields of view do not overlap onto adjacent tracks.

In FIG. 6B, however, in the presence of magnification errors, only field of view 80 is centered over track 90, while fields of view 81–86 are displaced from their respective tracks, with fields of view 85 and 86 (furthest from the center beam) being displaced the greatest distance. The magnification error shown in FIG. 6B causes all fields of view to be displaced toward the center field of view 80. This displacement can in turn cause the field of view of beams (other than the central beam) to overlap adjacent tracks, so that the data signal from one track contains a component of the data signal from an adjacent track. Under an opposite magnification error, the fields of view would be displaced away from central field of view 80, as shown in FIG. 6C, wherein the spacing between fields of view 80–86 is increased.

In accordance with the present invention, cross-talk is canceled from each of the data signals (other than that generated by the central beam), by subtracting from each data signal a scaled value of a data signal from one of the tracks adjacent to the track being read. Specifically, the adjacent track data signal is selected and scaled responsive to the magnification error. The magnification error may be continually determined based on output signals generated by photodetector 22 using the circuitry of FIG. 4, or may be determined by other methods described hereinbelow.

Figure 7:
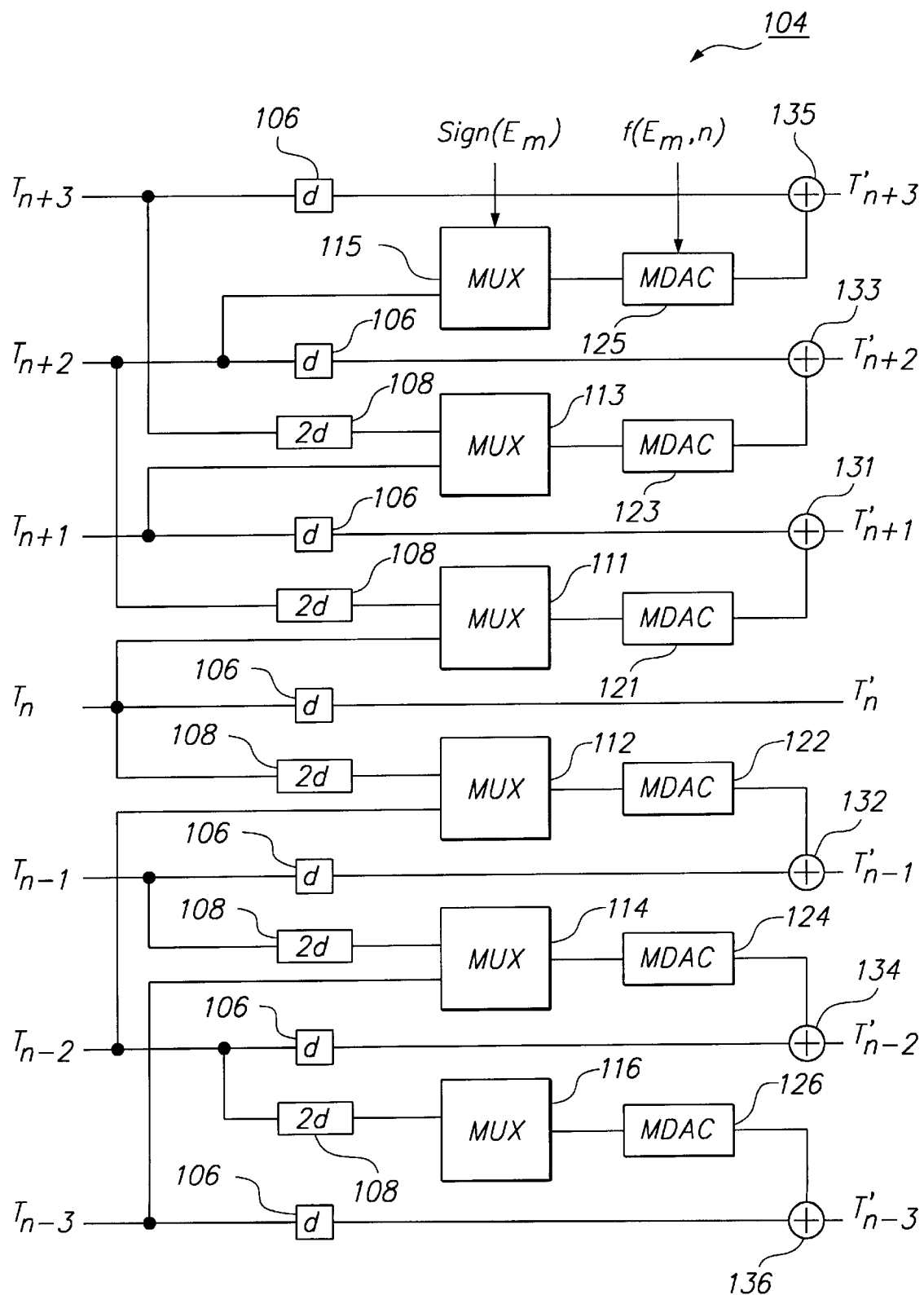
FIG. 7 is a schematic block diagram of an illustrative embodiment of electronic magnification error correction circuitry constructed in accordance with principles of the present invention.

Referring now to FIG. 7, front-end 33 includes exemplary circuit 104 for canceling cross-talk from the data signals generated by the outer elements of multi-element photodetector 22. Circuit 104 includes delay circuits 106 and 108, multiplexers 111–116, multiplying digital-to-analog converters (MDAC) 121–126 and summing amplifiers 131–136. Because it is expected that the central reading beam will be aligned with the center of the track being read, no cross-talk correction is performed for data signal $T_n$ generated by central element 50. The data signals for all of the other photodetector elements are corrected for cross-talk using the data signal from only one of the two adjacent tracks, depending upon the polarity of the magnification error.

Because the axis of the beam array generally is skewed relative to the radius of the optical disk, delay circuits 106 and 108 are provided to compensate for the phase relationship of the data signals output by the individual elements 50–56 of photodetector 22. Thus, for example, delay circuits 106 delay the timing of the signals output by the photodetector elements by an interval corresponding to the time difference between adjacent elements (e.g., $T_n$ and $T_{n-1}$), and delay circuits 108 delay the signals by an amount corresponding to the time difference between two elements separated by one other element (e.g., $T_n$ and $T_{n-2}$). Alternatively, all the track signals may be delayed so they correspond with the data signal from the last track (e.g., $T_{n+3}$).

The magnitude of the cross-talk correction depends on a number of factors. First, it is expected that only one of two adjacent track signals will contribute significant cross talk that must be corrected, and that cross-talk from the other track may be ignored. Which track is selected depends on the polarity of the magnification error. Under one polarity of magnification errors, the fields of view are shifted toward the central field of view. Thus, for example, field of view 81 is shifted toward field of view 80, or analogously, toward track 90 and away from track 93.

Under an opposite polarity of magnification error, the shift or displacement would be in the opposite direction, for example, field of view 81 would be closer to track 93 and farther from track 90. Accordingly, only the data signal from either track 90 or track 93 is scaled and subtracted from the data signal of track 91, depending on the sign, or polarity, of the magnification error as determined, for example, by the circuitry of FIG. 4.

The magnitude of the cross-talk correction also is a function of the magnitude of the magnification error. Larger magnification errors cause an increase in the overlap between a field of view and an adjacent track. For example, if the magnification error in FIG. 6B were increased, the overlap of field of view 81 onto track 90 also would increase.

The amount of overlap also depends on which field of view is being corrected, and the track location (e.g., near the disk center or periphery). Specifically, the farther a field of view is from the central field of view, the larger the correction that is needed. And because the curvature of the tracks being read varies with their location on the disk (tracks near the center of the disk are more highly curved than tracks near an outer edge of the disk), track location may result in greater overlap nearer the disk center.

In accordance with the principles of the present invention, a magnification error is determined, and then a scale factor is determined which is a function of the overlap between a field of view and an adjacent data track. The scale factor, which may be different for each track being read, is determined by taking into account the position of the track on the disk and the magnification error. Thus, for example, the correction for track 92 in FIG. 6B is given by equation (4):

$$T'_{92} = \begin{matrix} T_{92} - f(E_m, n) \times T_{94}, \text{ for } E_m > 0 \\ T_{92} - f(E_m, n) \times T_{90}, \text{ for } E_m < 0 \end{matrix} \quad (4)$$

where $f(E_m, n)$ is a scale factor dependent on the magnitude of $E_m$, the photodetector element, and the track number. Preferably, values for $f(E_m, n)$ are obtained from a lookup table, although they may be calculated as well. Arguments for table lookup include track number, photodetector element identification, and magnification error.

In view of the foregoing, cross-talk between the tracks sensed by the outer elements of photodetector 22 (e.g., elements 51–56 of FIG. 4) may be corrected using the circuitry shown in FIG. 7. Multiplexers 111–116 select one of the data signals from the adjacent elements based on the sign of the magnification error. Multiplying digital-to-analog converters (MDACs) 121–126 scale the selected signal, and summing amplifiers 131–136 add the scaled signal to the signal from the track being read. The magnitude of the magnification error, the position of the element relative to central element 50, and the track location on the disk may be used to compute a scale factor (for each track) that is then input to the respective multiplying digital-to-analog converter.

For example, multiplexer 111 accepts as inputs the data signals for tracks $T_n$ and $T_{n+2}$. The sign of the magnification error $E_m$ generated by circuit 70 of FIG. 4 is input to multiplexer 111 to select which data signal (e.g., $T_n$ or $T_{n+2}$) to output to MDAC 121. A scale factor, $f(E_m, n)$, determined as a function of the magnitude of the magnification error, beam number and track location is input to MDAC 121 to scale the output of multiplexer 111. The resulting product is then subtracted by summing amplifier 131 from the data signal for track $T_{n+1}$ to generate corrected value $T'_{n+1}$.

Alternatively, the circuitry of FIG. 7 may be implemented using digital circuitry, such as a microprocessor or digital signal processor (DSP). In this case, the data signals output by photodetector elements 50–56 are converted to digital signals and then manipulated to account for cross-talk. This conversion advantageously also simplifies handling the delay between the data signals caused by skewing the beam array relative to the radius of the optical disk.

Although the values of $f(E_m, n)$ may be calculated, the function is rather complex. Preferably, the values of $f(E_m, n)$ are obtained from a lookup table in which nominal values for the scale factor have been determined empirically based on testing of a particular design of optical disk reader reading a particular optical disk format.

Alternatively, values for the scale factor may be estimated while the optical disk reader is in use. Advantageously, this enables an optical disk reader to adjust the scale factor for different optical disks and operating environments. For example, when reading disks having a track pitch at the extremes of the specified range, using fixed scale factors may yield less than optimum cross talk correction. Similarly, thermal expansion may affect the spacing of the photodetector elements, thereby affecting the amount of cross talk. These variations may be accommodated by modifying scale factor values during operation using track counting or jitter analysis methods as described below.

In the track counting method, the lookup table of nominal scale factor values may be modified based on the actual track pitch measured on the optical disk, for example, as a function of radial location on the disk. In this method, multitrack pickup 32 is located at a first position, at which the block header is read. Multitrack pickup 32 is then moved to a second position a known distance from the first position, and the block header information for that track is read. While the multitrack pickup is being moved between the first and second positions, the number of tracks crossed are counted. From this information, the actual track pitch of the optical disk may be computed as the known distance divided by the number of tracks skipped.

The track pitch also may be calculated by determining the number of data blocks that fit into a known number of tracks.

Since the length of a data block along the spiral track is known, the length of the spiral portion of the track between the two blocks may be determined from the difference in block numbers read from the block header data. This difference may then be compared to the difference computed for an optical disk having a nominal track pitch, to estimate the actual track pitch of the disk.

Either of the forgoing techniques the may be repeated along the radius of the disk, thus generating a table of track pitch correlated to track position. The track pitch data is in turn used to adjust the scale factors stored in the previously programmed table of nominal values. Preferably, the actual table values are not changed, but rather, the scale factors are modified and stored in volatile memory each time they are used. For example, the scale factors may be increased or reduced in proportion to the difference between the measured track pitch and the nominal track pitch. Alternatively, some optical disks may include track pitch information in a header area of the optical disk. This information is read when the optical disk is inserted into the disk drive, and may be used to modify the nominal scale factor table.

The jitter analysis method may also be used to determine the scale factor. In this method, block header information or other data is read from several tracks, and the scale factor is dithered, to vary the amount of cross-talk correction applied to the track signals. This in turn effects the quality of the track signals for the data being read, as reflected in the error rate, for example, as determined by conventional ECC circuitry. The scale factor that produces the lowest error rate is then selected for use in reading data from the optical disk. This process may be repeated at selected points along the radius of the disk, or at selected intervals of time to generate a table of scale factors correlated to track positions. Alternatively, the process may be applied continually, so that the optimum scale factors are always being used.

These techniques may be performed as part of a calibration step when the optical disk is first inserted in the optical disk drive. During the calibration step, the optical disk is scanned and a lookup table of scale factors is generated that is correlated to track position using, for example, track counting or jitter analysis methods.

The lookup table created during the calibration step may be continuously or periodically consulted when simultaneously reading multiple tracks of the optical disk to vary the degree of correction. The lookup table values are generated whenever a new optical disk is inserted into the optical disk drive to account for local variations in track pitch, and may be periodically updated during the reading process.

As will be apparent from the foregoing, when the magnification error causes the sensed areas of the tracks to be too close together (as in FIG. 6B), the data signal for each element of photodetector 22 (other than central element 50), is corrected using the data signal for the track next closest to center element 50. Conversely, if the magnification error results in the sensed areas of the track being too far apart, the data signal for each element of photodetector 22 (other than central element 50), is corrected using the data signal for the track next farthest away from center element 50.

It also will be apparent from examination of FIG. 7 that the data signals from the outermost elements of photodetector 22, elements 55 and 56, cannot be corrected with a data signal for the track next farthest from the center element, because that track is not read by multitrack pickup 32. Accordingly, the outermost tracks can be corrected for cross-talk only when magnification error has one polarity (i.e., when the sensed areas are too close together). While this is not expected to pose a severe problem, another outer beam and photodetector element could be added to permit cross-talk correction in this situation. The outermost beams in this case would not be used for reading data, but only for providing cross-talk cancellation, when required.

Figure 8:
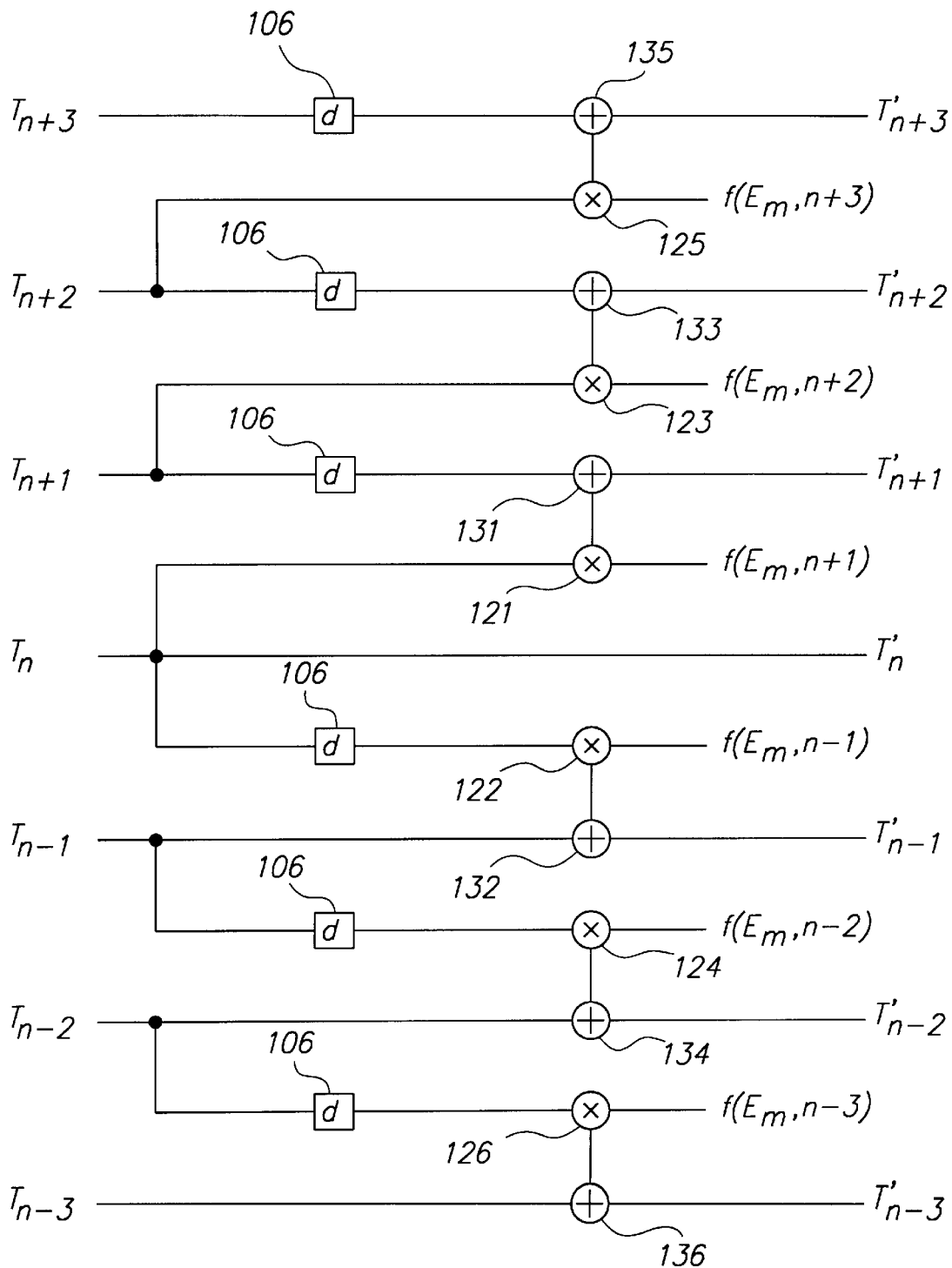
FIG. 8 is a schematic block diagram of an alternative illustrative embodiment of electronic magnification error correction circuitry constructed in accordance with principles of the present invention.

Alternatively, the foregoing issue may be accounted for by biasing the system (e.g., by physically arranging the pitch of the reading beams) for reading a disk having the minimum expected pitch and worst case magnification error. Such a design would guarantee that the measured magnification error is always in one direction. Specifically, the next track closer to the center track will always be the track to use for cross talk correction. Since it would be known a priori which one of the adjacent tracks is to be used for cross-talk correction, the circuitry in FIG. 7 could be greatly simplified, as shown in FIG. 8, by eliminating multiplexers 111–116 and a number of delay elements 106 and 108.

One skilled in the art will thus appreciate that the present invention may be practiced by other than the disclosed embodiments, which are present for purposes of illustration and not of limitation, and that the present invention is limited only by the claims which follow.

What is claimed is:

1. Apparatus for simultaneously reading multiple adjacent tracks of an optical disk, the apparatus comprising:

means for generating an array of reading beams including a center beam and a plurality of side beams, each side beam having a radial location in the array;

an optical system disposed in a path of the array of reading beams, the optical system directing the array of reading beams onto multiple adjacent tracks of the optical disk;

a plurality of photodetector elements including a center element and a plurality of side elements, the center element generating an output signal corresponding to the center beam, each one of the plurality of side elements generating an output signal for a corresponding one of the plurality of side beams;

means for detecting a magnification error; and means for correcting the output signal of at least one of the plurality of side elements responsive to the magnification error and the radial location of the side beam in the array.

2. The apparatus of claim 1 wherein the output signal of the at least one of the plurality of side elements comprises a cross-talk component for an adjacent one of the plurality of reading beams and the means for correcting corrects the output signal to reduce the cross-talk component.

3. The apparatus of claim 1 wherein two of the plurality of photodetector elements comprise split photodetector elements and the means for detecting the magnification error comprises circuitry for comparing output signals generated by the split photodetector elements.

4. The apparatus of claim 1 wherein the means for detecting the magnification error generates a lookup table containing values of magnification error correlated to radial location on the optical disk.

5. The apparatus of claim 4 wherein the lookup table is generated by comparing a computed track pitch to a nominal track pitch for a specified type of optical disk.

6. The apparatus of claim 4 wherein the lookup table is generated by analyzing jitter rates obtained when reading data from the optical disk.

7. The apparatus of claim 1 wherein the means for correcting the output signal of one of the side elements comprises circuitry for forming a weighted sum of the output signal and an output signal generated by an adjacent one of the plurality photodetector elements.

8. The apparatus of claim 7 wherein weights used in computing the weighted sum are determined responsive to the magnification error.

9. The apparatus of claim 8 wherein the weights are a function of a radial position of a track being read from the optical disk.

10. The apparatus of claim 8 wherein the weights are predetermined.

11. The apparatus of claim 8 wherein the weights are determined by measuring a track pitch of the optical disk.

12. The apparatus of claim 8 wherein the weights are determined by measuring an error rate in data being read from the optical disk while dithering the value of the weights, and selecting the value of the weights corresponding to a smallest measured error rate.

13. The apparatus of claim 1 wherein the center element comprises multiple divisions, the apparatus further comprising circuitry to compute a focus error signal using outputs of the multiple divisions.

14. The apparatus of claim 1 wherein at least two of the plurality of photodetector elements comprise split photodetector elements, the apparatus further comprising circuitry to compute a tracking error signal using outputs of the split photodetector elements.

15. A method for simultaneously reading multiple data tracks from an optical disk, the method comprising:

providing an array of reading beams including a center beam and a plurality of side beams, each side beam having a radial location in the array;

providing a plurality of photodetector elements including a center element and a plurality of side elements, the center element generating an output signal corresponding to the center beam, each one of the plurality of side elements generating an output signal for a corresponding one of the plurality of side beams;

generating a magnification error signal;

correcting the output signal for at least one of the plurality of side elements responsive to the magnification error signal and the radial location of the side beam in the array.

16. The method of claim 15 wherein the output signal generated by the at least one side element includes a cross-talk component for an adjacent one of the plurality of reading beams and correcting the output signal reduces the cross-talk component.

17. The method of claim 15 wherein correcting the output signal comprises forming a weighted sum of the output signal and an output signal generated by an adjacent one of the plurality photodetector elements.

18. The method of claim 17 wherein correcting the output signal further comprises adjusting weights used in forming the weighted sum.

19. The method of claim 18 wherein adjusting the weights comprises measuring a track pitch of the optical disk.

20. The method of claim 18 wherein adjusting the weights comprises:

analyzing an error rate in data signals generated by the plurality of photodetector elements;

perturbating the weights; and selecting the perturbed weights corresponding to a smallest error rate.

\* \* \* \* \*